United States Patent [19]

Cannon

[11] Patent Number: 4,786,136
[45] Date of Patent: Nov. 22, 1988

[54] OPTICAL FIBER ROTARY COUPLER

[75] Inventor: Vernon W. Cannon, Austin, Tex.

[73] Assignee: IEC Corporation, Austin, Tex.

[21] Appl. No.: 840,472

[22] Filed: Mar. 13, 1986

Related U.S. Application Data

[63] Continuation of Ser. No. 406,072, Aug. 6, 1982, abandoned.

[51] Int. Cl.[4] .................................................. G02B 6/38
[52] U.S. Cl. ................................ 350/96.21; 350/96.20
[58] Field of Search ......................... 350/96.21, 96.20; 339/2 A, 5 A, 6 A

[56] References Cited

U.S. PATENT DOCUMENTS 4,373,779  2/1983  Dorsey ........................ 350/96.21
4,445,752  5/1984  Faber et al. .................. 350/96.20

Primary Examiner—William L. Sikes
Assistant Examiner—Robert E. Wise
Attorney, Agent, or Firm—Kenneth R. Glaser

[57] ABSTRACT

An optical fiber rotary coupler includes an elongated support member adapted to be secured within the driver shaft of an electrical slip ring assembly and positioned on the axis of rotation of the driver shaft. Optical fibers are supported in connector bodies having end portions supported by radial bearings disposed within the bore of a coupler housing member. Lateral and angular alignment are maintained by the radial bearings in the housing bore and axial spacing of the connector body ends is maintained by dimensional control of the length of the bearing support housing, the thickness of two cylindrical thrust washers and the length of the connector body end portions with respect to a control surface or shoulder on each connector body.

5 Claims, 1 Drawing Sheet

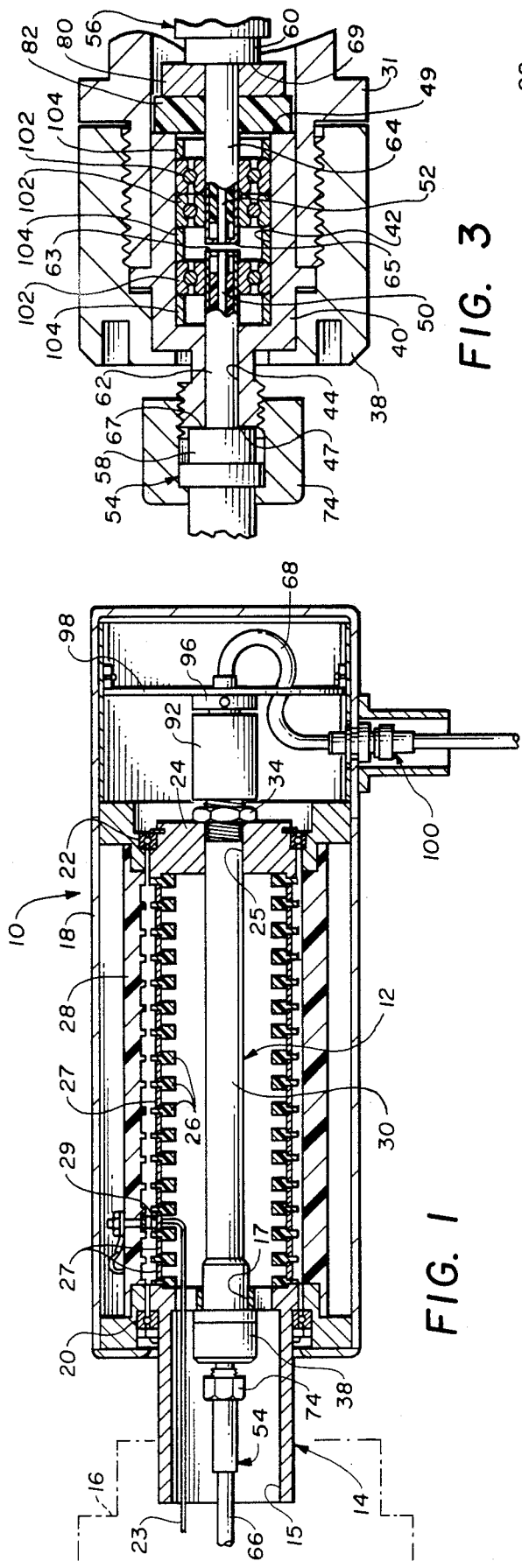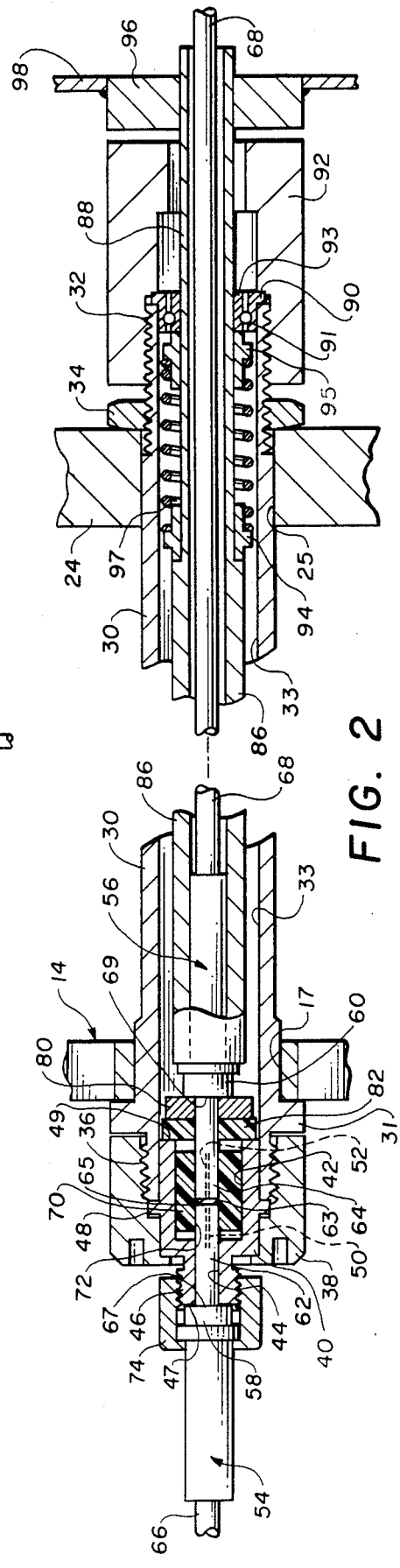

OPTICAL FIBER ROTARY COUPLER

This is a continuation of application Ser. No. 406,072, filed on Aug. 6, 1982, now abandoned.

BACKGROUND OF THE INVENTION

1. Field of the Invention

The present invention pertains to a rotary coupler device for transmitting a light signal between two relatively rotating optical fibers or waveguides.

2. Background Art

The development of optical fibers or waveguides for the transmission of light as a signal transmitting medium has offered several advantages in the art of data and communications transmission. However, one problem associated with signal transmission through optical fibers pertains to the requirement that the discrete fiber elements must be precisely aligned with and maintained in close proximity to each other at connections therebetween to avoid signal losses at the connections. The problems associated with reducing signal losses at static connections between end to end connected optical fibers, are aggravated when it is necessary to provide for a connection wherein one fiber is required to rotate with respect to another.

The problem of transmitting electrical signals from one member to another wherein the members are rotating relative to each other, has been solved by the so called slip ring device wherein a brush contact member is resiliently biased against a rotating cylindrical ring to accomplish signal transmission between relatively rotating members. However, in the transmission of light signals between relatively rotating members, precise alignment of the members is required while maintaining the members physically in non-contacting relationship.

Prior art efforts to develop optical fiber rotary couplers have resulted in very expensive devices which are still subject to dimensional tolerance errors in positioning one optical fiber with respect to the other. Moreover, prior art devices have not been particularly adapted for use with an electrical signal rotary coupler or slip ring assembly. Since there are many applications for optical fiber signal transmission systems which are used conjointly with electrical signal transmission systems, it is particularly desirable to provide a rotary coupler which is adapted for transmission of electrical signals as well as optical signals between relatively rotating structures. In this respect, the present invention is also directed to an improved rotary coupler or an optical fiber signal transmission system which is particularly adapted to be used in conjunction with an electrical slip ring assembly.

SUMMARY OF THE INVENTION

The present invention provides an improved rotary coupler for two relatively rotating optical fibers or optical waveguides wherein precise alignment of two end to end positioned optical fibers is maintained to minimize losses in signals transmitted between the fibers. In accordance with one aspect of the present invention, there is provided an optical fiber rotary coupler which is adapted to support two separate optical fiber elements in precise end to end positioned relationship wherein lateral misalignment, axial separation, and angular tilt of one optical fiber with respect to the other is minimized to reduce the signal power loss between the separate fiber elements. In this regard, the optical fiber rotary coupler of the present invention is adapted to support relatively rotating optical fibers by a housing member which is precisely manufactured to close dimensional tolerances within the capability of conventional machining and finishing practices. The housing member is adapted to support two separate connector bodies containing the ends of respective optical fibers which are precisely aligned with respect to the connector bodies. The coupler housing member is also adapted to support bearing means for further aligning the connector bodies with each other while permitting relative rotation between the connector bodies and the optical fibers supported thereby. The single housing member, together with thrust bearing elements of relatively uncomplicated mechanical design, permit the use of conventional optical fiber connector bodies and conventional manufacturing techniques for the housing member and thrust bearing elements so that precise dimensional control is possible and wherein the assembled coupler permits the accurate alignment of one optical fiber with respect to the other without subsequent adjustment of the positioning of the connector bodies.

In accordance with another aspect of the present invention, there is provided an optical fiber rotary coupler which is particularly adapted to be used in conjunction with an electrical and/or electrical power signal communication transmitting rotary coupler or slip ring assembly. The improved optical fiber rotary coupler is adapted to be mounted coaxially within an electrical slip ring assembly housing wherein optical fiber cables may be connected to the housing and to a rotary driver member rotatably supported by the housing. Accordingly, the present invention also provides an improved slip ring assembly which is adapted to transmit electrical signal and/or electrical power as well as light signals between two relatively rotating members.

Those skilled in the art will recognize the superior features and advantages discussed herein as well as other improvements provided by the present invention upon reading the detailed description which follows in conjunction with the drawings.

BRIEF DESCRIPTION OF THE DRAWING

FIG. 1 is a longitudinal central section view of an electrical slip ring assembly including the optical fiber rotary coupler of the present invention;

FIG. 2 is a longitudinal central section view on a larger scale of the optical fiber rotary coupler illustrated in FIG. 1; and FIG. 3 is a detail section view of the bearing support housing for the optical fiber rotary coupler of the present invention illustrating another embodiment of the bearing configuration for supporting and maintaining lateral alignment of the optical fibers.

DESCRIPTION OF THE PREFERRED EMBODIMENTS

In the description which follows, like parts are marked throughout the specification and drawings with the same reference numerals, respectively. Certain views of the drawings are not necessarily to scale and the scale may be exaggerated to better illustrate the features of the invention.

Referring particularly to FIG. 1, there is illustrated an electrical slip ring assembly generally designated by the numeral 10 and including an optical fiber rotary coupler assembly incorporated within the slip ring assembly and generally designated by the numeral 12. The electrical slip ring assembly is of a type which is generally well known, several versions of which are manufactured commercially by the assignee of the present invention. The slip ring assembly 10 is basically characterized by a rotary driver shaft 14 which is adapted to be connected to suitable rotating shaft means 16. The driver shaft 14 is supported for rotation relative to a hollow casing member, generally designated by the numberal 18. The driver shaft 14 is rotatably supported in spaced apart antifriction bearings 20 and 22. The driver shaft 14, as illustrated by way of example, may be a built up component comprising an idler end portion 24 and a plurality of axially spaced apart electrically nonconductive separator or spacer elements 26 between which are disposed electrically conductive rings 27. The overall assembly of the driver shaft 14, including the idler shaft portion 24 and the axially spaced stack of spacer elements 26 and conductive slip rings 27 forms a unitary assembly which is rotatable relative to a support block 28 on which may be mounted a plurality of spaced apart electrically conductive brushes 29, one shown in FIG. 1, which are adapted to be engageable with respective ones of the slip rings 27 for conducting electrical signals or electrical power from conductors connected to respective ones of the slip rings to further conductors, connected to respective ones of the aforementioned brushes.

A typical conductor 23 is shown connected to one of the slip rings 27 and is illustrated as being trained through an interior bore portion 15 of the driver shaft 14. Conductors connected to each one of the aforementioned brushes are suitably bundled and trained through a connector or feed through assembly connected to the casing 18 in a manner known in the art of electrical slip ring assemblies. The slip ring assembly 10 may, for example, comprise a type IEL electrical slip ring assembly manufactured by the assignee of the present invention, which has been modified in accordance with the improvements of the present invention. Moreover, those skilled in the art will recognize that slip ring assemblies of similar construction may also be modified in accordance with the instant invention which will be described in further detail hereinbelow.

Referring to FIGS. 1 and 2, the optical fiber coupler 12 is characterized by an elongated tubular support member, generally designated by the numeral 30. The support member 30 includes a flanged head portion 31 and an externally threaded portion 32 at the end of the support member opposite the flanged head. The support member 30 is adapted to be supported in coaxially aligned bores 17 and 25 formed in the driver shaft 14 and idler shaft portion 24, respectively, as shown. A nut 34 is threaded over the end portion 32 of the support member and is operable to secure the support member in assembly with the driver shaft 14 and to secure the driver shaft parts in assembly also. The support member 30 includes a second threaded portion 36 extending from the flanged head 31 and adapted to be threadedly engaged with a retaining nut 38 for a coupler housing member 40. The housing member 40 comprises a generally tubular member having a precision cylindrical bore 42 substantially coaxial with a smaller bore 44. The bore 42 is nominally held to a dimensional variation not to exceed approximately 12 microns. The housing member 40 also includes an axially extending reduced diameter threaded portion 46 and an annular locating and retaining flange 48 whereby the housing member is suitably retained in the bore 33 of the support member 30 by the retaining nut 38. The housing member 40 is also precision machined to maintain minimum dimensional variation between opposed transverse end faces 47 and 49. Typically, the dimensional variation of the distance between the end faces 47 and 49 is held to less than 2.5 microns and the end faces are perpendicular to the central axis of the bore 42.

The housing member 40 is adapted to include bearing means for locating two opposed optical fibers 50 and 52 so that these fibers are aligned laterally, are held spaced apart at a predetermined axial spacing from each other, and are secured against angular misalignment. The optical fibers 50 and 52 are each mounted in a holding member comprising connector bodies 54 and 56 which include respective head portions 58 and 60 and opposed cylindrical axially projecting end portions 62 and 64, respectively. The connector bodies 54 and 56 may be identical in construction and may be of a type adapted to support a jacketed single or multiple optical fiber element. One type of connector which is suitable for use in conjunction with the arrangement of the present invention is a type 905/906 fiber optic connector for single channel terminations manufactured by Amphenol, Oak Brook, Ill. The connector bodies 54 and 56 are each adapted to support the end portions of jacketed fiber optic cables 66 and 68 which contain the respective optical fibers 50 and 52.

The optical fibers 50 and 52 are maintained in lateral alignment with respect to the axis of rotation of the rotary coupler 12 by journalling the connector body end portions 62 and 64 in radial bearing means comprising, in the embodiment of FIG. 2, a tubular bearing sleeve 70. The bearing sleeve 70 is disposed in the bore 42 in a precise sliding fit and includes an interior bore 72 which is adapted to journal the respective connector body end portions 62 and 64. Accordingly, the bearing 70 is adapted to maintain the optical fibers 50 and 52 in lateral or axial alignment and within conventional machining tolerances in the range of 5 microns of total coaxiality.

The connector body 54 is secured to the housing 40 by a suitable nut 74 which may comprise part of the commercially available connector previously discussed. The nut 74 is engageable with the threaded portion 46 to secure a transverse shoulder 67 on the connector body 58 against the surface 47. A corresponding transverse shoulder 69 is formed on the connector body head 60 and is adapted to be maintained in abutting relationship with a cylindrical thrust bearing comprising a thrust washer 80 engaged with a second thrust washer 82 bearing against the end face 49 of the housing 40. The thrust washer 80 may be formed of a conventional bearing metal such as brass and the thrust washer 82, as well as the bearing sleeve 70, may both be formed of a suitable filled or unfilled plastic composition such as a polyimide resin made under the trademark Vespel by DuPont Company, Wilmington, Del.

The axial spacing between the transverse end faces of the connector body end portions 62 an 64 may be controlled by controlling the position of the shoulders 67 and 69 with respect to the respective transverse end faces 63 and 65, by controlling the length of the housing member 40 between the end faces 47 and 49 and by controlling the thickness of the washers 82 and 80. Dimensional control over these components as required to limit the spacing between the end faces of the connector body end portions 62 and 64, may be provided using conventional machining and material finishing techniques. For example, the overall distance between the shoulders 67 and 69 in assembly, as shown in FIG. 2, may be controlled to a total dimensional variation of 2.5 microns using finish grinding and polishing procedures on the respective parts and selective assembly procedures. In fact, the procedure for polishing the distal ends of the optical fibers 50 and 52 to provide the desired optical characteristics also can be used to determine the axial spacing between the respective connector body end faces 63, 65 and the locating shoulders 67 and 69. Since the formation of the distal ends of the fibers 50 and 52 normally requires cutting or breaking the fiber end faces to be flush with the end faces of the connector body end portions a subsequent fiber end polishing process is required to improve the optical properties and this process may also be used to determine the length of the connector body end portions.

Since the connector body 54 rotates with respect to the connector body 56, there is relative rotation between the bearing sleeve 70 and either one of the connector body end portions 62 or 64. In the particular arrangement illustrated in the drawings, the slip ring housing 18 is normally maintained stationary while the driver shaft 14 rotates together with the housing 40 and the support member 30 as well as, of course, the connector body 54 and cable 66. Accordingly, there is relative rotation between the thrust washers 80 and 82 across their abutting faces. However, the bearing sleeve 70 may rotate with respect to either connector body end portions 62 or 64. Moreover, the bearing sleeve 70 may be dimensioned to be a loose sliding fit in the bore 42 and lateral or radial alignment and support of the connector body end portions 62 and 64 with respect to each other may be controlled substantially by the sleeve 70 and the fit of the end portions 62 and 64 in the bore 72.

Referring further to FIG. 2, the connector body 56 is suitably mounted in and secured to an elongated tubular sleeve 86 having a reduced diameter portion 88 on which is mounted a radial type antifriction bearing 90. The bearing 90 may be, for example, a type AVF16K24DD made by Fafnir Bearings Div., Textron, Inc., New Britain, Conn. The outer race 91 of the bearing 90 is supported in the bore 33 of the support member 30 and the bearing is secured in the bore by a nut 92 threadedly engaged with the threaded end portion 32. The tubular sleeve 86 is slidably disposed in the bore of the inner race 93 of the bearing 90 and together with the connector body 56 is biased toward the connector body 54 by a coil spring 97 interposed between spring support spacers 94 and 95. The spring 97 biases the sleeve member 86 together with the connector body 56 and the optical fiber cable 68 toward the connector body 54 whereby the minimum axial gap between the connector body end portions 62 and 64 is maintained constant as determined by the dimensions of the respective parts described previously herein. The sleeve 86 is also secured to an anti-rotation bracket 96 which is secured within the interior of the casing 18 by a suitable bracket portion 98, as shown in FIG. 1. The cable 68 extends out of the open end of the sleeve 86 to a suitable optical fiber bulkhead connector or feed through assembly 100 mounted on the side of the slip ring assembly casing 18 whereby the optical signals transmitted through the cables 66-68 may be conducted to a signal receiving or transmitting means, not shown.

The arrangement of the rotary coupler 12 is particularly advantageous in that the lateral alignment of the optical fibers 50 and 52 is provided by a radial bearing of relatively uncomplicated form mounted within a housing member which is easily formed to closely held dimensional tolerances, since the bore 42 and the cylindrical dimensions of the bore 72 and the outer diameter of the bearing sleeve 70 may be relatively easily held to close dimensional tolerances. Moreover, with the bearing sleeve arrangement illustrated in FIG. 2 lateral or radial misalignment may be primarily controlled by precise control over the diameters of the connector body end portions 62 and 64 and the diameter of the bore 72 in the sleeve 70. Angular deflection or misalignment of the optical fibers 50 and 52 is also easily minimized by supporting the connector body end portions 62 and 64 in bearing means disposed in the bore 42. Accordingly, radial or lateral alignment, axial spacing and angular alignment of the optical fibers 50 and 52 may be maintained to extremely close tolerances by the arrangement of parts in accordance with the present invention.

FIG. 3 illustrates another embodiment of the radial bearing arrangement for supporting the connector body end portions 62 and 64. In the arrangement according to FIG. 3, the bearing sleeve 70 has been replaced by a plurality of antifriction precision ball bearing units 102 which are disposed within the bore 42 of the housing 40 and are suitably spaced apart by axial spacer rings 104. With the arrangement of the bearings 102, the bearing supporting the connector body end portion 62 does not rotate relative to the housing 40 and hence may comprise a single row bearing as illustrated. However, since the connector body end portion 64 is rotating relative to the housing 40 and is supported in the bearings 102, a double row bearing arrangement is provided for handling the bearing loads and alignment. The spacers 104 are provided to hold the bearings in the general position illustrated although the total cumulative dimensional width of the bearings 102 and the spacers 104 is less than the total length of the bore 42 so that no thrust preload is imposed on any of the bearings 102.

With the arrangement illustrated in FIG. 3, radial or lateral alignment of the optical fibers 50 and 52 is also easily maintained with precision, thanks to the provision of the single bore 42 formed in the housing 40 which is in supportive relationship to the precision ball bearings 102. The bearings 102 may be of a type commercially available such as a type AV8K16DD also manufactured by Fafnir Bearings Div. The bearings 102 are preferably a light press fit in the bore 42 and since the connector body end portion 62 does not rotate relative to the housing 40, this bearing only controls the radial and angular alignment of the optical fiber 50 with respect to the fiber 52.

The operation of the coupler 12 in conjunction with the slip ring assembly 10 is believed to be clearly understood from the foregoing description. Typically, the casing 18 of the slip ring assembly is mounted stationary and the driver shaft 14 is connected to a rotating component such as the shaft 16, leading from a machine or the like wherein the transmission of optical signals through the cable 66-68 and the transmission of electrical signals and/or electrical power through one or more conductors 23 is desired. Accordingly, the optical fiber 52 is adapted to transmit or recieve an optical signal with respect to the fiber 50 with minimal signal power loss due to the maintenance of highly accurate alignment between the fiber ends. Moreover, the coupler 12 also provides means for maintaining the slip ring driver shaft parts in assembly and is conveniently disposed coaxially on the slip ring assembly to permit relative rotation between the connector bodies 54 and 56.

Although the specific embodiment described herein discusses the use of a coupler in accordance with the present invention wherein single optical fibers are coupled to provide for relative rotation therebetween, those skilled in the art will appreciate that various other arrangements may be provided in accordance with the improvements of the present invention. For example, fiber elements arranged coaxially with respect to the axis of rotation of the coupler 12 may also be utilized. Those skilled in the art will recognize that other modifications and substitutions may be made to the specific structural arrangement disclosed without departing from the scope and spirit of the invention as recited in the appended claims.

What is claimed is:

1. In an electrical slip ring assembly comprising a casing, shaft means rotatably mounted in said casing, cooperating slip ring and contact means supported by respective ones of said shaft means and said casing for transmitting electrical signals between conductor means connected to said slip ring and said contact means, respectively, an optical fiber rotary coupler associated with said slip ring assembly and comprising a support member disposed on said shaft means and adapted for supporting respective opposed ends of two optical fibers for relative rotation of one fiber with respect to the other fiber about the axis of rotation of said shaft means for transmitting light signals from said one fiber to said other fiber during rotation of said shaft means with respect to said casing.

2. The slip ring assembly set forth in claim 1 wherein: said support member comprises an elongated hollow bolt having a transverse flange portion adjacent one end and a threaded portion adjacent the opposite end, said bolt being adapted to secure separate parts of said shaft means in assembled relationship.

3. The slip ring assembly set forth in claim 1 or 2 wherein:
said support member is adapted to support a coupler housing member including a cylindrical bore, bearing means disposed in said bore in said housing member and adapted to support opposed optical fiber holding members in radial alignment for the transmission of light signals between said optical fibers held by respective ones of said holding members.

4. The slip ring assembly set forth in claim 3 wherein:
said holding members comprise optical fiber connector bodies each having a cylindrical end portion adapted to be supported in said bearing means, and said connector bodies each include transverse surface portions for locating said holding members with respect to said housing member to maintain a predetermined axial spacing between the opposed ends of said optical fibers.

5. A connector assembly for transmitting both electrical and optical signals comprising, in combination:
 (a) a casing having electrically conductive means associated therewith;
 (b) an electrical slip ring assembly comprising a rotatably driven shaft assembly supported for rotation within said casing, said shaft assembly supporting a plurality of electrical conductors which make electrical contact with said electrically conductive means, thereby enabling the transmission of electrical signals between the electrically conductive means of said casing and the electrical conductors of said rotatably driven shaft assembly;
 (c) a first optical fiber holding assembly mounted to rotate with said rotatably driven slip ring shaft assembly, said first assembly having first connector means for retaining a first fiber optic cable and positioning first optical fibers of said first cable in the axial direction of the axis of rotation of said rotatably driven slip ring shaft assembly;
 (d) a second optical fiber holding assembly having second connector means for retaining a second fiber optic cable and positioning second optical fibers of said second fiber optic cable in the axial direction of rotation of said rotatably driven slip ring shaft assembly, said first optical fiber holding assembly adapted to rotate with respect to said second optical fiber holding assembly;
 (e) means for maintaining said first optical fibers in axial alignment with, and at predetermined spacing from, said second optical fibers during the rotation of said first optical fiber holding assembly;
 (f) whereby optical signals can be transmitted between said first and second fiber optic cables simultaneous with the transmission of electrical signals between conductors of said casing and said slip ring assembly, during the rotation of said rotatably driven ring shaft assembly.

* * * * *